(12) United States Patent
Kuo

(10) Patent No.: US 9,507,100 B2
(45) Date of Patent: Nov. 29, 2016

(54) OPTICAL FIBER CONNECTOR

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/552,777

(22) Filed: Nov. 25, 2014

(65) Prior Publication Data

US 2015/0153518 A1 Jun. 4, 2015

(30) Foreign Application Priority Data

Nov. 30, 2013 (CN) .......................... 2013 1 0622506

(51) Int. Cl.
*G02B 6/42* (2006.01)
*G02B 6/38* (2006.01)
*G02B 6/32* (2006.01)

(52) U.S. Cl.
CPC .......... *G02B 6/3885* (2013.01); *G02B 6/3865* (2013.01); *G02B 6/32* (2013.01); *G02B 6/3853* (2013.01); *G02B 6/4214* (2013.01); *G02B 6/4284* (2013.01); *G02B 6/4292* (2013.01)

(58) Field of Classification Search
CPC .... G02B 6/4292; G02B 6/3863; G02B 6/42; G02B 6/32; G02B 6/4284; G02B 6/4204; G02B 6/3897; G02B 6/3893; G02B 6/4278
See application file for complete search history.

(56) References Cited

U.S. PATENT DOCUMENTS

| | | | |
|---|---|---|---|
| 6,356,686 B1* | 3/2002 | Kuczynski | 385/39 |
| 6,771,860 B2* | 8/2004 | Trezza et al. | 385/52 |
| 2003/0087505 A1* | 5/2003 | Deane | 438/422 |
| 2004/0120658 A1* | 6/2004 | McFarland et al. | 385/89 |
| 2005/0135742 A1* | 6/2005 | Basavanhally et al. | 385/33 |
| 2005/0265671 A1* | 12/2005 | Ono et al. | 385/92 |
| 2006/0251360 A1* | 11/2006 | Lu et al. | 385/88 |
| 2008/0037934 A1* | 2/2008 | Daikuhara et al. | 385/33 |
| 2009/0098760 A1* | 4/2009 | Gurreri et al. | 439/374 |
| 2012/0170892 A1* | 7/2012 | Lin | G02B 6/3853 385/59 |
| 2013/0071069 A1* | 3/2013 | Hsu | G02B 6/322 385/77 |
| 2013/0077978 A1* | 3/2013 | Duis et al. | 398/139 |
| 2013/0089290 A1* | 4/2013 | Sloey et al. | 385/74 |
| 2013/0136368 A1* | 5/2013 | Ishizaka | 382/201 |
| 2013/0216189 A1* | 8/2013 | Grinderslev et al. | 385/78 |
| 2013/0266260 A1* | 10/2013 | Morioka | G02B 6/4214 385/33 |

\* cited by examiner

*Primary Examiner* — Thomas A Hollweg
*Assistant Examiner* — Mary A El Shammaa
(74) *Attorney, Agent, or Firm* — Zhigang Ma

(57) ABSTRACT

The optical fiber connector assembly includes a first connector and a second connector. The first connector includes at least two positioning pillars corresponding to the optical fibers. The first connector defines at least two optical fiber holes for receiving and positioning the optical fiber. Each optical fiber hole passes through a distal end of a corresponding positioning pillar. The second connector defines at least two positioning holes corresponding to the positioning pillars. Each positioning hole includes an end surface in the second connector. The second connector includes at least two first lenses corresponding to the optical fibers. Each first lens is positioned on the end surface of a corresponding positioning hole. The optical fibers are respectively aligned with the first lenses by an engagement of the positioning posts and the positioning holes.

19 Claims, 4 Drawing Sheets

OPTICAL FIBER CONNECTOR

FIELD

The present disclosure relates to a connector, more particularly, to an optical fiber connector assembly.

BACKGROUND

An optical fiber connector includes a first connector and a second connector corresponding to the first connector. The first connector connects to the second connector by shafts and holes method. The first connector and the second connector respectively comprise coupling lenses for coupling light signals.

However, in manufacturing process of optical fiber connector the precision of shafts and holes and coupling lenses must be considered; increasing the difficulties of injection molding of the optical fiber connector and the accuracy requirement of a mold, which in turn increases a cost of the optical fiber.

BRIEF DESCRIPTION OF THE DRAWINGS

Implementations of the present technology will now be described, by way of example only, with reference to the attached figures.

DETAILED DESCRIPTION

Figure 1:
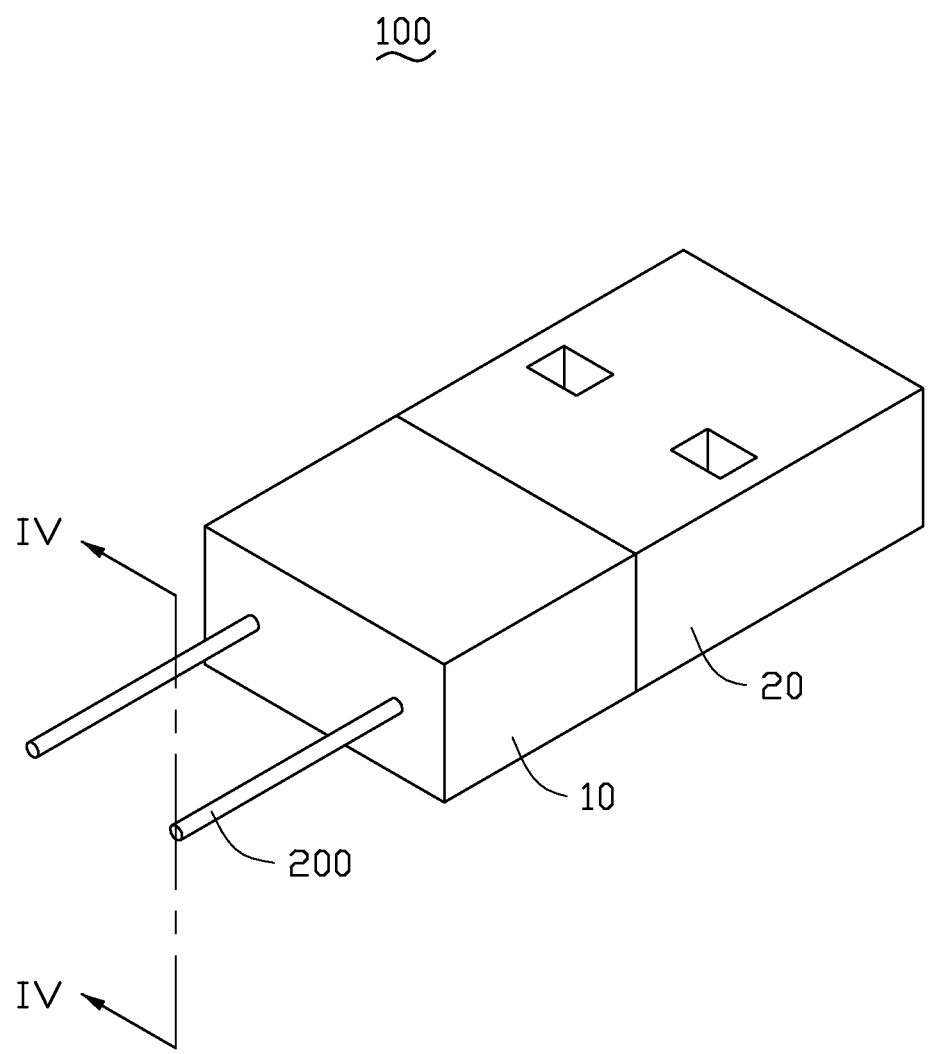
FIG. 1 is an isometric view of an optical fiber connector assembly in accordance with an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Figure 2:
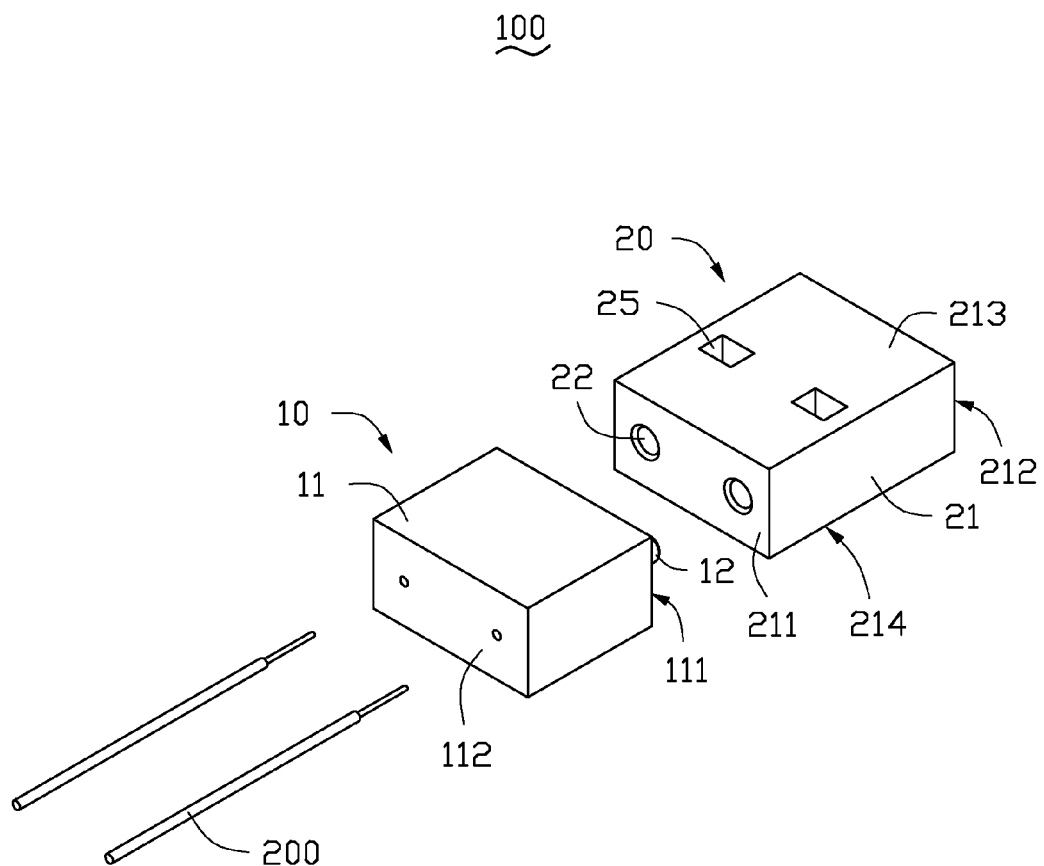
FIG. 2 is an isometric exploded view of the optical fiber connector assembly in FIG. 1.
Figure 3:
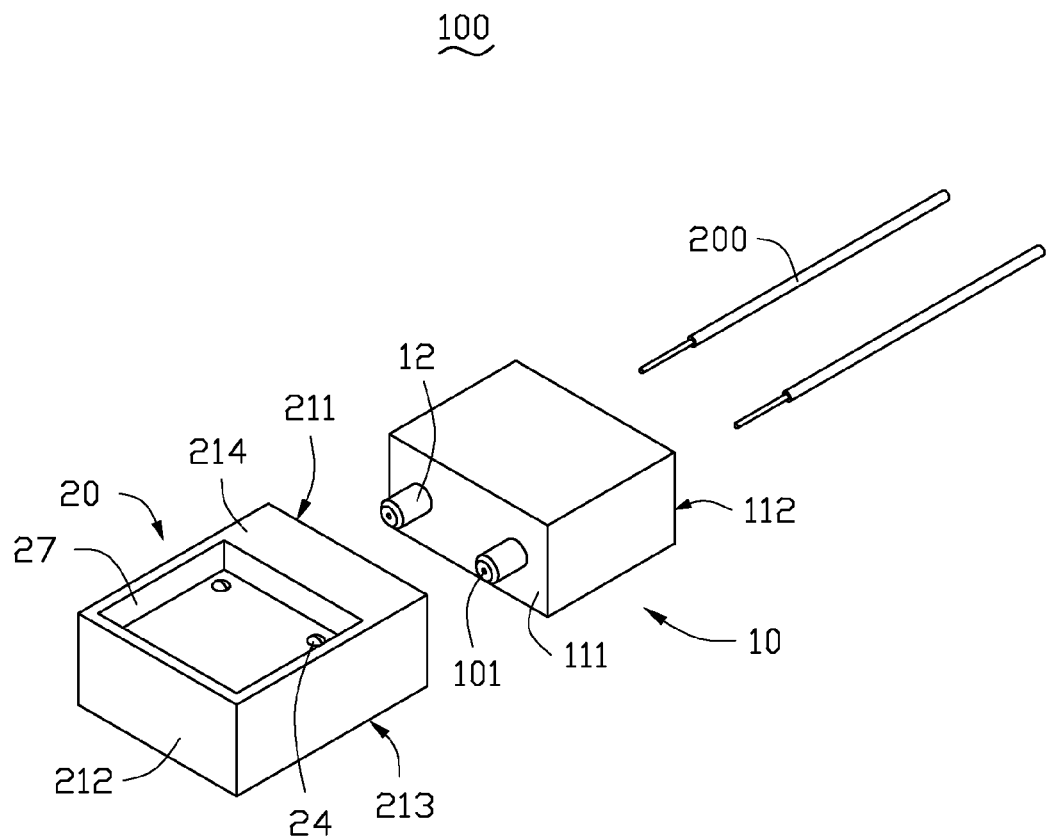
FIG. 3 is an isometric, exploded view along another angle of the optical fiber connector assembly in FIG. 2.
Figure 4:
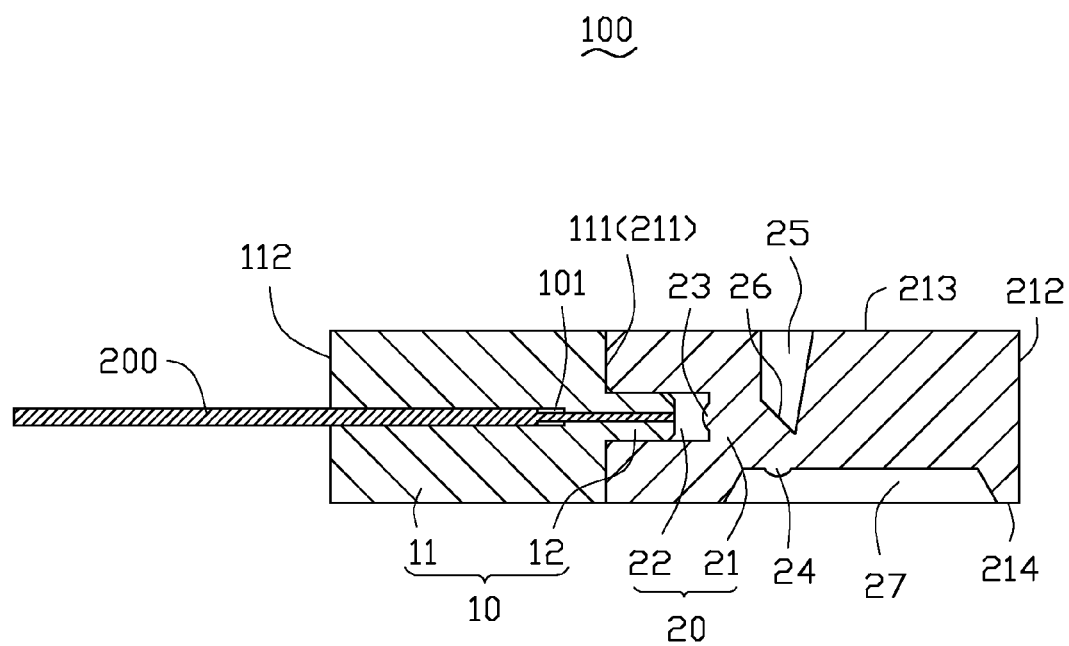
FIG. 4 is a cross sectional view of the optical fiber connector assembly along a line IV-IV of FIG. 1.

FIGS. 1 to 4 illustrate that an optical fiber connector assembly 100 is used for connecting at least two optical fibers 200. In this embodiment, the number of the optical fibers is two. The optical fiber connector assembly 100 includes a first connector 10 and a second connector 20 corresponding to the first connector 10.

The first connector 10 includes a first main body 11 and two positioning pillars 12 formed on the first main body 11. In one embodiment, the first main body 11 is generally a rectangular parallelepiped and includes a first surface 111 facing the second connector 20 and an opposite second surface 112. The positioning pillar 12 extends perpendicularly on the first surface 111. The positioning pillar 12 extends along a direction perpendicular to the first surface 111. In this embodiment, the positioning pillar 12 is cylindrical. The positioning pillar 12 can be other shapes, for example a prismatic or tapered shape.

The first connector 10 defines two optical fiber holes 101 corresponding to the positioning pillars 12. The optical fiber hole 101 extends along a direction perpendicular to the second surface 112 and penetrates through the positioning pillar 12 from the second surface 112 to the first surface 111. A central axis of the optical fiber hole 101 is corresponding to a central axis of the positing pillar 12.

The second connector 20 includes a second main body 21 and two positioning holes 22 corresponding to the positioning pillar 12 received within the second main body 21. The second main body 21 is rectangle. The second connector 20 includes a third surface 211 toward to the first connector 10, and a fourth surface 212 opposite to the third surface, a top surface 213, and a bottom surface 214 opposite to the top surface 213. The top surface 213 and the bottom surface 214 connect perpendicularly to the third surface 211 and the fourth surface 212. The positioning holes 22 are the blind holes of the third surface 211. A shape and size of positioning holes 22 are corresponding to that of the positioning pillars 12. Each positioning hole 22 has an end surface 221 in the second connector 20.

The second connector 20 includes two first lenses 23 corresponding to the positioning holes 22 and two second lenses 24 corresponding to the first lenses 23. The first lenses 23 are respectively formed on the end surface 221 of the positioning hole 22. A center of the first lens 23 is corresponding to a center axis of the positioning hole 22. The second lens 24 is formed at one side of the bottom surface 214 of the second main body 21. An optical axis of the first lens 23 is perpendicular to the third surface 211. An optical axis of the second lens 24 is perpendicular to the optical axis of the first lens 23. In this embodiment, the first lens 23 and the second lens 24 are convex lenses.

The second connector 20 has two recesses 25 respectively corresponding to the first lens 23. A light refractive surface 26 is formed by each recess 25 inside the second main body 21. The light refractive surface 26 intersects with the optical axis of the first lens 23 and the optical axis of the second lens 24. In this embodiment, an angle between the light refractive surface 26 and the optical axis of the first lens 23 is 45 degrees. An angle between the light refractive surface 26 and the optical axis of the second lens 24 is 45 degrees.

In this embodiment, the recess 25 is arranged at the top surface 213. On the other hand, the recess can be arranged at the other surface of the second main body 21, the light refractive surface 26 can be arranged at the predetermined position.

The second connector 20 includes a recessing portion 27 at the bottom surface 214. The second lens 24 is formed at a bottom of the recessing portion 27. The recessing portion 27 can avoid obstruction of the lens during the assembling process of the second connector 20. Moreover, during the assembling process of the second connector 20, damage to the second lens can be avoided.

During the assembling process, the optical fiber 200 is respectively inserted into the corresponding optical fiber hole 101. The positioning pillar 12 is inserted into the corresponding optical fiber hole 101. The first connector 10 connects to the second connector 20. The optical fibers 200 respectively align with the corresponding first lenses 23.

Because the optical fiber hole penetrate through the corresponding positioning pillar 12, the necessity of arranging the lens on the first connector 10 is not required. That simplifies the design of the mold of the first connector 10. Thus, the cost of production of the first connector 10 is reduced.

Moreover, the first lens is formed on the end surface 221 of the positioning hole 22, so the positioning hole 22 and the first lens can be formed by the same mold. That simplifies the design of the second connector 20 and reduces the cost of the second connector 20.

Because the hole of the optical fiber 101 is inserted into the positioning pillar 12 and the first lens 23 is inserted into the positioning hole 22, a relative distance of the optical fiber holes 101, a relative distance of positioning pillars 12, a relative distance of positioning holes 22, and a relative distance of the first lenses 23 are the same value. That simplifies the design and process of the optical fiber connector assembly 100.

The embodiments shown and described above are only examples. Many details are often found in the art such as the other features of an optical fiber connector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical fiber connector assembly comprising:
a first connector and a second connector, the first connector including at least two positioning pillars, the first connector having at least two optical fiber holes, the second connector having at least two positioning holes corresponding to the positioning pillars, each positioning hole including an end surface in the second connector, the second connector including at least two first lenses, the first connector connecting the second connector by the positioning pillars and the positioning holes, wherein each optical fiber hole penetrates through an end of one positioning pillar and each first lens is arranged on the end surface of one positioning hole, and wherein each of the optical fibers is aligned with one of the corresponding positioning pillars along a common axis, and each of the first lenses is aligned with one of the corresponding positioning holes along a common axis.

2. The optical fiber connector assembly of claim 1, wherein a center axis of the optical fiber hole corresponds to a center axis of the positioning pillar, and a center of the first lens is respective located at a center axis of the positioning hole.

3. The optical fiber connector assembly of claim 1, wherein the first connector includes a first main body, the first main body includes a first surface toward the second connector and a second surface opposite to the first surface, the positioning pillar is formed at the first surface and extends along a direction perpendicular to the first surface, the optical fiber hole extends along a direction perpendicular to the second surface and penetrates through the corresponding positioning pillar.

4. The optical fiber connector assembly of claim 1, wherein the second connector includes a second main body, the second main body includes a third surface toward the first connector, a fourth surface opposite to the third surface, a top surface, and a bottom surface opposite to the top surface.

5. The optical fiber connector assembly of claim 4, wherein the second connector includes a light refractive surface corresponding to the first lenses, the light refractive surface is used for refracting a light signal passing through the first lenses with a predetermined angle.

6. The optical fiber connector assembly of claim 4, wherein the second connector includes at least two second lenses corresponding to the first lenses, the second lenses are formed at one side of the bottom surface of the second main body, the light refractive surface refracts a light signal between the first lenses and the second lenses.

7. The optical fiber connector assembly of claim 6, wherein an optical axis of the second lenses are perpendicular to an optical axis of the first lenses, an angle between the light refractive surface and the first lenses is 45 degrees, and an angle between the light refractive surface and the second lenses is 45 degrees.

8. The optical fiber connector assembly of claim 6, wherein the second connector includes a recessing portion, the second lenses are formed at a bottom of the recessing portion.

9. The optical fiber connector assembly of claim 4, wherein the second main body has a recess corresponding to the first lenses, the light refractive surface is formed by the recess inside the second main body.

10. The optical fiber connector assembly of claim 9, wherein the recess is arranged at the top surface of the second main body.

11. The optical fiber connector assembly of claim 2, wherein the first connector includes a first main body, the first main body includes a first surface toward the second connector and a second surface opposite to the first surface, the positioning pillar is formed at the first surface and extends along a direction perpendicular to the first surface, the optical fiber hole extends along a direction perpendicular to the second surface and penetrates through the corresponding positioning pillar.

12. The optical fiber connector assembly of claim 2, wherein the second connector includes a second main body, the second main body includes a third surface toward the first connector, a fourth surface opposite to the third surface, a top surface, and a bottom surface opposite to the top surface.

13. The optical fiber connector assembly of claim 12, wherein the second connector includes a light refractive surface corresponding to the first lenses, the light refractive surface is used for refracting a light signal passing through the first lenses with a predetermined angle.

14. The optical fiber connector assembly of claim 12, wherein the second connector includes at least two second lenses corresponding to the first lenses, the second lenses are formed at one side of the bottom surface of the second main body, the light refractive surface refracts a light signal between the first lenses and the second lenses.

15. The optical fiber connector assembly of claim 14, wherein an optical axis of the second lenses is perpendicular to an optical axis of the first lenses, an angle between the light refractive surface and the first lenses is 45 degrees, and an angle between the light refractive surface and the second lenses is 45 degrees.

16. The optical fiber connector assembly of claim 14, wherein the second connector includes a recessing portion, the second lenses are formed at a bottom of the recessing portion.

17. The optical fiber connector assembly of claim 13, wherein the second main body has a recess corresponding to the first lenses, the light refractive surface is formed by the recess inside the second main body.

18. The optical fiber connector assembly of claim 17, wherein the recess is arranged at the top surface of the second main body.

19. An optical fiber connector comprising:
- a first main body having at least a first substantially planar surface with at least two positioning pillars extending substantially perpendicularly from the first surface, with an optical fiber hole defined in each positioning pillar and extending through the first main body;
- a second main body having a first substantially planar surface and at least two receiving holes defined extending into the second main body from the second main body planar surface, the receiving holes having an end surface positioned farthest from the second main body planar surface; and
- at least two first lenses, each first lens arranged on the end surface of one of the two or more receiving holes;
- wherein, the positioning pillars are receivable by the positioning holes so as to align each optical fiber hole with a corresponding one of the first lenses.

\* \* \* \* \*